(12) United States Patent
Saito

(10) Patent No.: US 7,369,570 B2
(45) Date of Patent: May 6, 2008

(54) ISCSI APPARATUS AND COMMUNICATION CONTROL METHOD FOR THE SAME

(75) Inventor: Yoshihiro Saito, Tokyo (JP)

(73) Assignee: NEC Corporation, Tokyo (JP)

( * ) Notice: Subject to any disclaimer, the term of this patent is extended or adjusted under 35 U.S.C. 154(b) by 798 days.

(21) Appl. No.: 10/782,777

(22) Filed: Feb. 23, 2004

(65) Prior Publication Data

US 2004/0174893 A1   Sep. 9, 2004

(30) Foreign Application Priority Data

Mar. 3, 2003   (JP) .............................. 2003-055434

(51) Int. Cl.
*H04J 3/16* (2006.01)
(52) U.S. Cl. ..................................... 370/466
(58) Field of Classification Search ............... None
See application file for complete search history.

(56) References Cited

U.S. PATENT DOCUMENTS 6,831,893 B1 * 12/2004 Ben Nun et al. ........... 370/235

2003/0172342 A1 * 9/2003 Elzur ........................ 714/776

FOREIGN PATENT DOCUMENTS

| JP | 11-85710 | 3/1999 |
| JP | 2002-318725 | 10/2002 |

* cited by examiner

*Primary Examiner*—Robert W. Wilson
(74) *Attorney, Agent, or Firm*—Young & Thompson

(57) ABSTRACT

An apparatus communicates with a device via a network. The apparatus comprises a first processor, a second processor and a network controller. The network controller receives first and second types of packets from the network and selectively sends information in the first and second types of packets to the first and second processors. The network controller sends information in the first and second types of packets to the first and second processors, respectively, if a connection with the device has been established, such that information in the second type of packets is processed exclusively by the second processor.

8 Claims, 3 Drawing Sheets

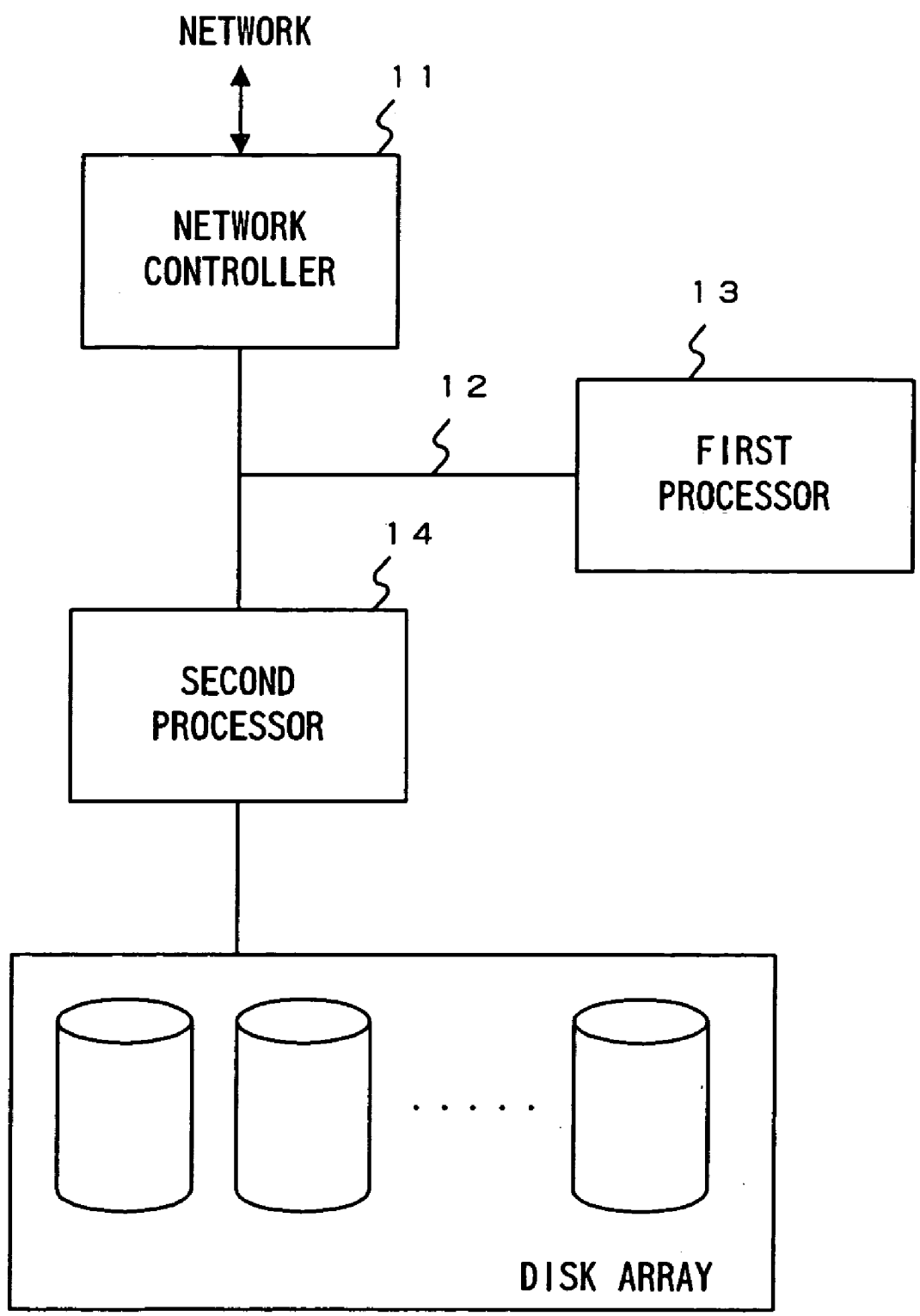
F I G. 2

ISCSI APPARATUS AND COMMUNICATION CONTROL METHOD FOR THE SAME

BACKGROUND OF THE INVENTION

1. Field of the Invention

The present invention relates to an iSCSI apparatus and, more particularly, to load reduction on a communication controller of the apparatus.

2. Related Background of the Invention

Recently, iSCSI (internet Small Computer System Interface) technology has been standardized by the Internet Engineering Task Force (IETF). SCSI technology is widely used as a technology for connecting storages to hosts. The iSCSI technology is a technology in which the SCSI technology is applied to an IP network such as a LAN. The iSCSI technology allows storages to directly connect to an IP network. The iSCSI protocol is a TCP/IP-based protocol. The iSCSI protocol establishes and manages connections between IP-based storage devices such as disk arrays and hosts as well as clients.

In the iSCSI technology, SCSI commands are encapsulated within IP packets. The IP packets encapsulating the SCSI commands are sent out over a network. Therefore, a sender-side computer needs to encapsulate the SCSI commands within the IP packets. The encapsulation within the IP packets involves processing of dividing the SCSI commands and data into smaller data elements. On the other hand, a receiver-side computer needs to decapsulate the IP packets. The decapsulation of the IP packets involves processing of combining the divided data and the like. If there is an error in the received data, many processings are required at the sender-side computer as well as at the receiver-side computer, such as request for data retransmission, retransmission of data in response thereto, checking of the correctness of the retransmitted data.

In the iSCSI technology, loads on communication controllers at both the sender and receiver sides are thus increased, in comparison with conventional technologies such as the SCSI technology and Fiber Channel technology. In addition, signals generated due to broadcasting and the address resolution protocol (ARP) travel over the computer network, and therefore the sender and receiver sides also need to process these signals.

Since the communication controller is in general realized by software, a load on a CPU increases as the load of the communication control processing increases. In order to reduce the load on the CPU, there exists a chip, called a TOE (TCP/IP offload engine), exclusively executing TCP/IP processing. A network adapter and the like which include the TOEs are also proposed. Nevertheless, a further increase in the load on the CPU is inevitable because, in future, transmission rates on a network are improved, the number of connected devices is increased, and transmission signals are increased with the increase in the number of connected devices. Accordingly, there is concern about deterioration in performance of an iSCSI apparatus such as a storage, which may accompany an increase in load on a CPU.

A conventional iSCSI technique is shown in Japanese Patent Laid-Open No. 2002-318725.

SUMMARY OF THE INVENTION

It is an object of the present invention to provide an iSCSI apparatus which can maintain its performance without being affected by an increase in the amount of network processing.

An apparatus according to the present invention communicating with a device via a network comprises a first processor; a second processor; and a network controller receiving first and second types of packets from the network and selectively sending information in the first and second types of packets to the first and second processors. The network controller sends information in the first and second types of packets to the first and second processors, respectively, if a connection with the device has been established, such that information in the second type of packets is processed exclusively by the second processor.

A first type of packet may be embodied in the form of the "specific packet" shown in the preferred embodiment. A second type of packet may be embodied in the form of the "packet other than the specific packet" shown in the preferred embodiment.

According to the present invention, a second processor processes the specific packet after the establishment of a connection between the iSCSI apparatus and another device. The specific packet is, for example, an iSCSI packet. A first processor processes other packets. Accordingly, in the iSCSI apparatus of the present invention, it is possible to process the specific packet without being affected by an increase in the amount of network processing.

BRIEF DESCRIPTION OF THE DRAWINGS

This above-mentioned and other objects, features and advantages of this invention will become more apparent by reference to the following detailed description of the invention taken in conjunction with the accompanying drawings, wherein:

FIG. 2 is a block diagram showing a concrete example of the iSCSI apparatus of the present invention.

DESCRIPTION OF THE PREFERRED EMBODIMENT

A detailed description will be given of the preferred embodiment of the present invention with reference to the drawings.

Figure 1:
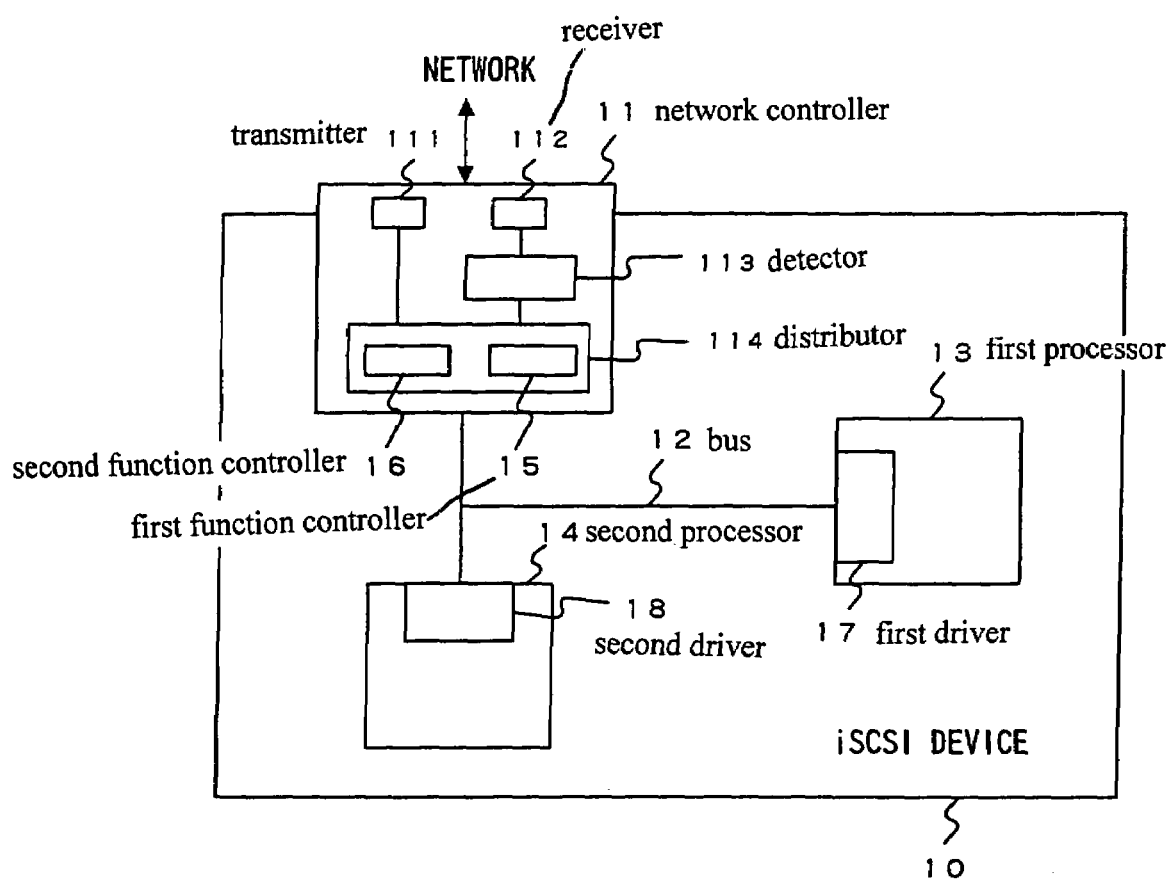
FIG. 1 is a block diagram showing a configuration of an iSCSI apparatus according to an embodiment of the present invention.

FIG. 1 is a block diagram showing a configuration of an iSCSI apparatus 10 according to an embodiment of the present invention. The iSCSI apparatus 10 includes a network controller 11 to be connected to a TCP/IP network, a first processor 13, and a second processor 14. The first and second processors 13 and 14 are connected with the network controller 11 through a peripheral component interconnect (PCI) bus 12.

The network controller 11 includes a transmitter 111, a receiver 112, a detector 113, and a distributor 114. The network controller 11 is a multifunctional PCI device.

The transmitter 111 transmits IP packets from the iSCSI apparatus 10 to the network. The receiver 112 receives IP packets transmitted via the network.

An IP packet to be communicated over the network includes a header containing IP packet source information and protocol information which indicates whether the IP packet is an iSCSI protocol-based packet, that is, whether or not the IP packet contains a SCSI command. The protocol information is set valid when a sender encapsulates a SCSI command within an IP packet.

The detector 113 refers to the header of the IP packet received by the receiver 112. The detector 113 determines whether or not the received IP packet is a specific packet, based on the protocol information in the header. Here, the specific packet is a packet in which protocol information is set valid, and a sender indicated by the source information in the header of the IP packet coincides with a device designated by the first processor.

The detector 113 determines whether the identified packet is to be sent to the first processor or the second processor. A method of the above determination will be described later in detail. The distributor 114 sends information in the packet identified by the detector 113 to the first or second processor in accordance with the determination of the detector 113. The distributor 114 includes a first function controller 15 corresponding to the first processor 13, and a second function controller 16 corresponding to the second processor 14.

The network controller 11 includes configuration registers (not shown in the figures) respectively corresponding to the first and second function controllers 15 and 16. Each of the configuration registers includes a base address register which stores information to define the locations of a memory space and an I/O space, and information to define the sizes thereof. The first and second function controllers 15 and 16 are identified by the first and second processors 13 and 14, respectively, based on the information stored in these base address registers.

The first function controller 15 communicates with the first processor 13. The first function controller 15 decapsulates IP packets received from the network. The first function controller 15 combines the data, checks the correctness thereof, and further, sends a retransmission request if necessary. The first function controller 15 passes the decapsulated packet, that is, information in the IP packet, on to the first processor 13.

Moreover, the first function controller 15 encapsulates a packet received from the first processor 13, based on TCP/IP. The first function controller 15 sends out the IP packet encapsulating the packet over the network. In this way, the first function controller 15 performs encapsulation and decapsulation of IP packets.

The second function controller 16 communicates with the second processor 14. The operation of the second function controller 16 is similar to that of the first function controller 15.

The first processor 13 controls the whole apparatus 10. On startup, the first processor 13 stores information identifying the first and second function controllers 15 and 16 in the base address registers of the network controller 11. The first processor 13 operates as a first function driver 17 for controlling the first function controller 15. The first processor 13 transmits and receives IP packets to and from another device, e.g. a host, on the network. The first processor 13 establishes a connection to transmit and receive IP packets containing SCSI commands with the other device. If the connection with the other device has been established, the first processor 13 sends a notification signal to the detector 113. In addition, when the connection with the other device has been established, the first processor 13 sends the detector 113 information on the other device with which the connection has been established as information identifying a specific packet.

The second processor 14 operates as a second driver 18 for controlling the second function controller 16. The second processor 14 operates as a TCP/IP offload engine (TOE). The second processor 14 exclusively processes SCSI commands. The second processor 14 is a controller for controlling a disk array as shown in FIG. 2, for example. The second processor 14 processes a SCSI command received from the second function controller 16. The second processor 14 writes data in the disk array in accordance with the SCSI command. The second processor 14 reads data from the disk array in accordance with the SCSI command.

Figure 3:
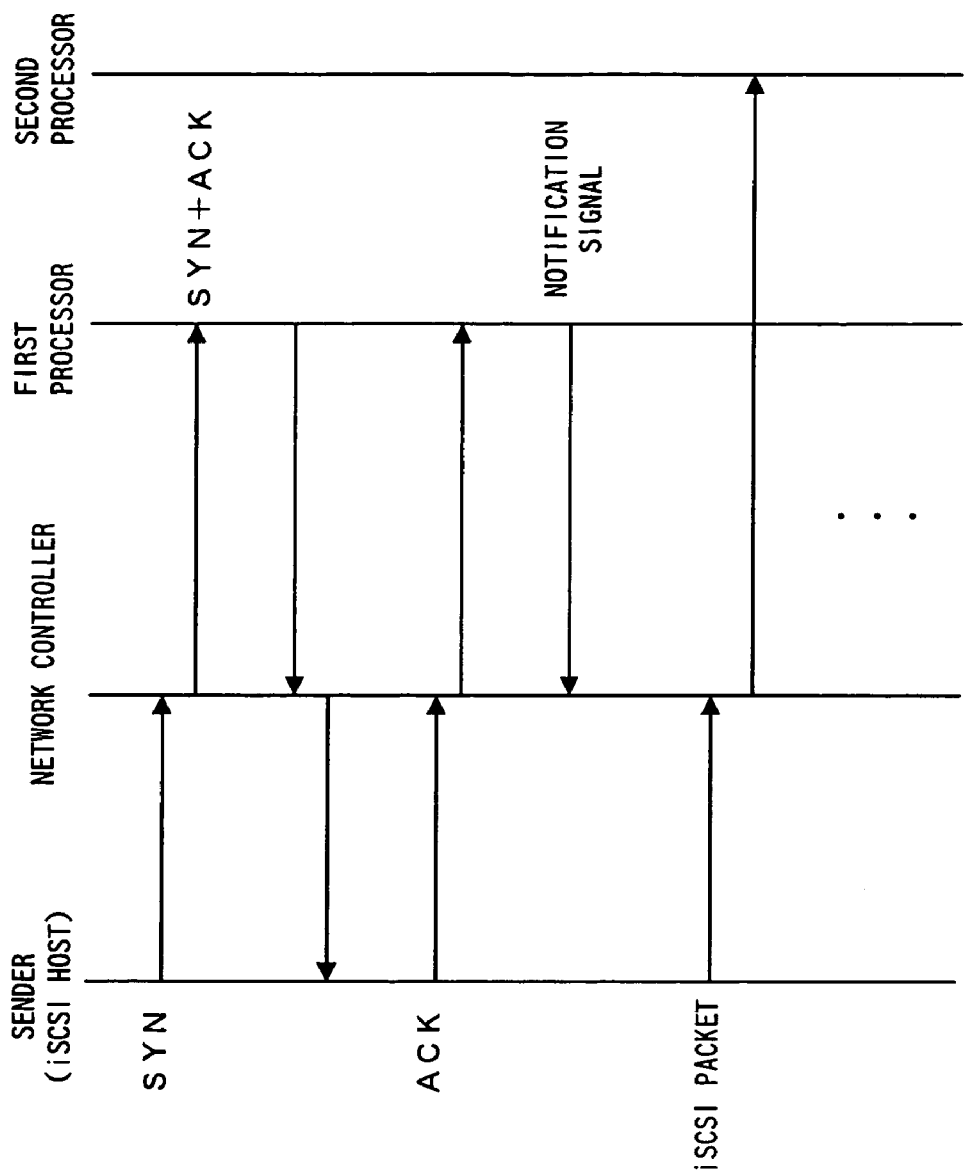
FIG. 3 is a time chart for explaining the operation of the iSCSI apparatus.

Next, a description will be given of the operation of the iSCSI apparatus 10 according to this embodiment with reference to FIGS. 1 and 3.

When the iSCSI apparatus 10 is connected to a TCP/IP network, a unique IP address is assigned to the iSCSI apparatus 10. Consequently, a plurality of hosts connected to the network each becomes able to access the iSCSI apparatus 10.

The receiver 112 receives IP packets, including broadcasted packets, sent to the apparatus 10 from the network. The receiver 112 passes the received IP packets on to the detector 113.

The detector 113 determines whether or not the IP packets received from the network are specific packets.

If the detector 113 has not received from the first processor 13 a notification signal indicating that a connection with another device has been established, the detector 113 sends all the IP packets to the first function controller 15 of the distributor 114.

On the other hand, if the detector 113 has already received the notification signal from the first processor 13, the detector 113 refers to the information in the header of each IP packet. In addition to the notification signal, the detector 113 receives from the first processor 13 information on the other device with which the connection has been established. Based on the information on the other device with which the connection has been established, the detector 113 detects whether or not the sender of the IP packet coincides with the other device with which the connection has been established (condition 1). Further, the detector 113 refers to the protocol information contained in the header of the IP packet received from the network. Based on the protocol information, the detector 113 detects whether or not the IP packet is an iSCSI protocol-based packet, that is, whether or not the IP packet contains a SCSI command (condition 2).

If the conditions 1 and 2 are met, the detector 113 identifies the IP packet as the specific packet. The detector 113 sends the specific packet to the second function controller 16 of the distributor 114. The detector 113 sends the other packets than the specific packet to the function controller 15 of the distributor 114.

Each of the first and second function controllers 15 and 16 decapsulates the IP packets received from the detector 113. The first and second function controllers 15 and 16 send the decapsulated packets to the corresponding first processor 13 or second processor 14 respectively. The packet sent from the second function controller 16 to the second processor 14 is a SCSI command because the packet meets the aforementioned conditions 1 and 2.

The first processor 13 executes processing according to the packets received from the first function controller 15. The processing of all packets received via the network is executed by the first function controller 15 and the first processor 13 until a connection has been established between the iSCSI apparatus 10 and another device on the network.

When another device on the network transmits a SCSI command to the iSCSI apparatus 10, it is necessary to establish a TCP/IP connection (hereinafter, simply referred to as connection) between the device and the iSCSI apparatus 10. For the establishment of this connection, a procedure called three-way handshaking to exchange three packets is performed. The three-way handshaking is performed by the first processor 13.

To be more specific, the other device (hereinafter, referred to as sender) which is to establish a connection with the iSCSI apparatus 10 transmits a packet "SYN" requesting the connection, to the iSCSI apparatus 10 via the network. Since the detector 113 has not received from the first processor 13 a notification signal indicating that a connection has been established, the detector 113 sends the first processor 13 the packet "SYN" received through the receiver 112. On receipt of the packet "SYN," the first processor 13 creates a packet "SYN+ACK," which is the packet "SYN" with the addition of predetermined information. The packet "SYN+ACK" is sent to the transmitter 111 through the first function controller 15. The transmitter 111 transmits the packet "SYN+ACK" to the sender via the network. On receipt of the packet "SYN+ACK," the sender removes predetermined information from the packet "SYN+ACK" to create a confirmation packet "ACK." The sender transmits the confirmation packet "ACK" to the iSCSI apparatus 10 via the network. The confirmation packet "ACK" is sent to the first processor 13 through the detector 113. On receipt of the confirmation packet "ACK," the first processor 13 determines that a connection has been established between the iSCSI apparatus 10 and the sender. The first processor 13 sends the detector 113 a notification signal indicating that the connection has been established. In addition to the notification signal, the first processor 13 sends the detector 113 information on the sender with which the connection has been established. The information on the sender with which the connection has been established is used as information indicative of a specific packet.

On the other hand, the second processor 14 executes processing according to a packet received from the second function controller 16, that is, according to a SCSI command.

As apparent from the above description, after the establishment of the connection between the iSCSI apparatus 10 and the other device, the second processor 14 processes the specific packet, i.e., the SCSI command. Accordingly, the second processor 14 can dedicate itself to processing to be natively executed by the iSCSI apparatus 10, for example, the processing as a disk array. That is, an iSCSI apparatus is realized in which the processing of a SCSI command is little affected by an increase in the amount of network processing due to the connection of the iSCSI apparatus to an IP network.

The present invention has been described in detail. However, it should be appreciated that various changes may be made to the present invention without departing from its spirits. For example, although the second function controller 16 is controlled by the second function driver 18 in the above embodiment, the second function controller 16 may be implemented by hardware which is not under control of the second processor 14. In this case, the load on the second processor is further reduced.

What is claimed is:

1. An apparatus communicating with a device via a network comprising:
 a first processor;
 a second processor; and
 a network controller receiving a first type of packets and a second type of packets from said network, and selectively sending information in the first type of packets and the second type of packets to said first processor and said second processor, wherein,
 said network controller sends information in the first type of packets and the second type of packets to said first processor and said second processor, respectively, if a connection with said device has been established, such that information in said second type of packets is processed exclusively by said second processor,
 said network controller sends information in both of the first type of packets and the second type of packets to said first processor if a connection with said device has not been established, and
 said first processor provides said network controller with information for detecting said second type of packets when a connection with said device is established.

2. The apparatus according to claim 1, wherein said second type of packets is a group of packets which meet specific conditions, and said first type of packets is a group of packets other than said second type of packets.

3. An apparatus communicating with a device via a network comprising:
 a first processor;
 a second processor; and
 a network controller receiving a first type of packets and a second type of packets from said network, and selectively sending information in the first type of packets and the second type of packets to said first processor and said second processor, wherein,
 said network controller sends information in the first type of packets and the second type of packets to said first processor and said second processor, respectively, if a connection with said device has been established , such that information in said second type of packets is processed exclusively by said second processor,
 said network controller includes a detector and a distributor,
 said detector determines whether a packet received from said network is the second type of packets, and further determines whether information in the packet is to be sent to said first processor or said second processor,
 the distributor sends information in said packet received from said network to one of said first and second processors according to a determination of said detector,
 said first processor sends a notification signal to said detector when a connection with said device is established,
 said detector determines that information in both of the first type of packets and the second type of packets are to be sent to said first processor based on said detector not receiving said notification signal from said first processor, and
 said detector determines that information in the first type of packets and the second type of packets is to be sent to said first processor and said second processor, respectively, conditioned on said detector receiving said notification signal from said first processor.

4. The apparatus according to claim 3, wherein said second type of packets is a group of packets which meet specific conditions, and said first type of packets is a group of packets other than said second type of packets.

5. The apparatus according to claim 3, wherein said first processor provides said network controller with information for detecting said second type of packets when a connection with said device is established.

6. The apparatus according to claim 5, wherein said network controller receives the first type of packets and the second type of packets based on a first protocol, and said second type of packets is further formed in accordance with a second protocol.

7. The apparatus according to claim 6, wherein said distributor includes a first controller and a second controller corresponding to said first processor and said second processor, respectively, and said first controller and said second controller encapsulate and decapsulate a packet based on said first protocol.

8. The apparatus according to claim 6, said first protocol is transmission control protocol/internet protocol (TCP/IP) and said second protocol is internet small computer systems interface (iSCSI) protocol.

* * * * *